(12) United States Patent
Volchegursky et al.

(10) Patent No.: US 9,231,885 B1
(45) Date of Patent: Jan. 5, 2016

(54) METHOD AND SYSTEM FOR CALCULATING COSTS OF APPLICATION OPERATIONS IN A VIRTUALLY PROVISIONED ENVIRONMENT

(71) Applicant: EMC Corporation, Hopkinton, MA (US)

(72) Inventors: Dmitry Volchegursky, Pleasanton, CA (US); Dmitry Limonov, Dublin, CA (US); Boris Shpilyuck, Dublin, CA (US); Alex Rankov, Danville, CA (US)

(73) Assignee: EMC Corporation, Hopkinton, MA (US)

( * ) Notice: Subject to any disclaimer, the term of this patent is extended or adjusted under 35 U.S.C. 154(b) by 275 days.

(21) Appl. No.: 13/785,088

(22) Filed: Mar. 5, 2013

(51) Int. Cl.
*G06F 15/16* (2006.01)
*H04L 12/911* (2013.01)

(52) U.S. Cl.
CPC ..................... *H04L 47/70* (2013.01)

(58) Field of Classification Search
CPC ......... H04L 1/00; H04L 47/70; H04L 47/722; H04L 47/726; H04L 47/724; H04L 47/781; H04L 47/782; H04L 47/788
USPC ......................................................... 709/226
See application file for complete search history.

(56) References Cited

U.S. PATENT DOCUMENTS

| | | | |
|---|---|---|---|
| 2005/0005012 A1* | 1/2005 | Odhner et al. | 709/226 |
| 2008/0162709 A1* | 7/2008 | Hrischuk et al. | 709/230 |
| 2008/0306798 A1* | 12/2008 | Anke et al. | 705/8 |
| 2009/0031066 A1* | 1/2009 | Bansal et al. | 710/113 |
| 2009/0235268 A1* | 9/2009 | Seidman et al. | 718/104 |
| 2010/0049570 A1* | 2/2010 | Li et al. | 705/8 |
| 2011/0078291 A1* | 3/2011 | Bickson et al. | 709/221 |
| 2011/0231541 A1* | 9/2011 | Murthy et al. | 709/224 |
| 2013/0326067 A1* | 12/2013 | Smith, II et al. | 709/226 |
| 2014/0280454 A1* | 9/2014 | Medard et al. | 709/202 |

* cited by examiner

*Primary Examiner* — Douglas Blair
(74) *Attorney, Agent, or Firm* — Dergosits & Noah LLP; Todd A. Noah

(57) ABSTRACT

Calculating costs of application operations in a virtually provisioned environment is described. Servers are identified that support application operations associated with executing an application, based on a configuration file. A count of each type of application operation currently executing and a resource utilization associated with each of the servers are recorded. A set of linear equations is created if the resource utilization is recorded on the number of occasions that equals the number of application operation types. Each linear equation equates a sum of a count of each type of application operation recorded as executing during an occasion with the resource utilization recorded on the occasion. The set of linear equations is solved to estimate and output resource costs of each individual type of application operation to assist in resource management.

20 Claims, 3 Drawing Sheets

US 9,231,885 B1

METHOD AND SYSTEM FOR CALCULATING COSTS OF APPLICATION OPERATIONS IN A VIRTUALLY PROVISIONED ENVIRONMENT

BACKGROUND

An enterprise may face a challenge in evaluating whether sufficient resources are available to sufficiently support the users of a critical enterprise application or whether sufficient resources are available to meet service level agreements of the critical enterprise application. Evaluation tools commonly use benchmarks on sets of simple low level, often atomic system operations, such as document check-in, object create, and document relate. However, such operations are simple, and do not reflect the entire complexity of the operations which the application users can perform, or indicate the impact of each operation that a user can perform in the application on the entire application environment. Such high level operations are executed in the context of some business goal, such as paying for a purchase, and may be referred to as "business level operations." Two types of business level operations that users can perform include operational screen opening and operation on a screen. The evaluation challenge is that any such business level operation can trigger a set of simpler operations, all the way down to atomic operations, such as the operations to save or delete an object. For example, many "open screen" high-level operations load a screen and execute data services to populate the screen's result list and charts. In another example, an administrator adds a new user by clicking on a screen, the system opens a window to collect the necessary information and, on submit, executes business logic or even an automated business process that will go to a repository and create a new entry, call an application programming interface to create the new user, and send a notification email to the newly created user. The challenge is determining the impact of each one of the business level operations that users perform in the context of other simultaneously running operations under parallel load on top of complex multi-server virtually provisioned environments under existing service level agreements.

BRIEF DESCRIPTION OF THE DRAWINGS

Advantages of the subject matter claimed will become apparent to those skilled in the art upon reading this description in conjunction with the accompanying drawings, in which like reference numerals have been used to designate like elements, and in which:

DETAILED DESCRIPTION

Embodiments herein calculate costs of application operations in a virtually provisioned environment. Servers are identified that support application operations associated with executing an application, based on a configuration file. In a very simple example, an analysis application identifies server #1 and server #2 that support an application operation for opening a welcome screen, based on a configuration file for a welcome screen application. A count of each type of application operation currently executing and a resource utilization associated with each server are recorded. In a very simple example, the analysis application takes snapshots of a system's status, which includes 380 instances of application operation A, 320 instances of application operation B, 54% CPU utilization on server #1, 70% memory utilization on server #1, 80% I/O utilization on server #1, 40% CPU utilization on server #2, 40% memory utilization on server #2, and 67% I/O utilization on server #2. A set of linear equations is created if a resource's utilization is recorded on a number of occasions that equals the number of application operation types, wherein each linear equation equates a sum of a count of each type of application operation recorded as executing during an occasion with the resource's utilization recorded during the occasion. In a very simple example, since two snapshots were taken of the resources' utilization and server #1 serves two application operations, the analysis application creates the set of two equations: 54% CPU=380A+320B and 52% CPU=340A+360B because server #1 had a 54% CPU utilization while supporting 380 instances of application operation A and 320 instances of application operation B during the first snapshot and server #1 had a 52% CPU utilization while supporting 340 instances of application operation A and 360 instances of application operation B during the second snapshot. The set of linear equations is solved to estimate and output resource costs of each individual type of application operation to assist in resource management. In a very simple example, the analysis application solves the set of two linear equations to estimate the impact of application operation A on server #1 as 0.1% CPU utilization and the impact of application operation B on the server #1 as 0.05% CPU utilization. The analysis application calculates the resource costs of each application operation in a virtually provisioned environment, which enables fine-tuning a system for a particular type of application operation performance, finding the dependency between application operation types and actual server performance, estimating how many users can be supported by the current servers and with the current service level agreements, and predicting servers entering into the red zone of a service level agreement, such as a CPU utilization of more than 90%.

Figure 1:
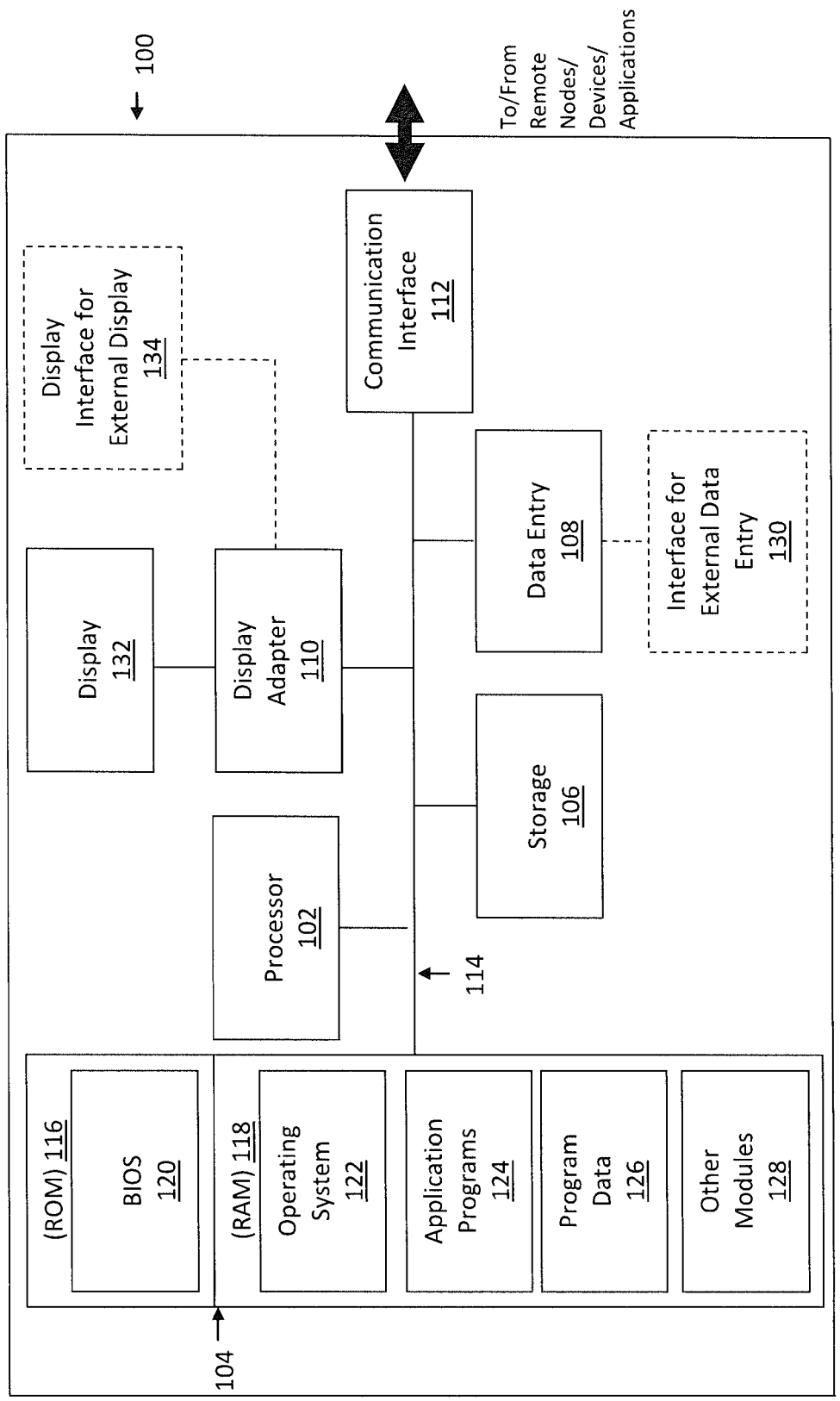
FIG. 1 is a block diagram illustrating an example hardware device in which the subject matter may be implemented.

Prior to describing the subject matter in detail, an exemplary hardware device in which the subject matter may be implemented shall first be described. Those of ordinary skill in the art will appreciate that the elements illustrated in FIG. 1 may vary depending on the system implementation. With reference to FIG. 1, an exemplary system for implementing the subject matter disclosed herein includes a hardware device 100, including a processing unit 102, memory 104, storage 106, data entry module 108, display adapter 110, communication interface 112, and a bus 114 that couples elements 104-112 to the processing unit 102.

The bus 114 may comprise any type of bus architecture. Examples include a memory bus, a peripheral bus, a local bus, etc. The processing unit 102 is an instruction execution machine, apparatus, or device and may comprise a microprocessor, a digital signal processor, a graphics processing unit, an application specific integrated circuit (ASIC), a field programmable gate array (FPGA), etc. The processing unit 102 may be configured to execute program instructions stored in memory 104 and/or storage 106 and/or received via data entry module 108.

The memory 104 may include read only memory (ROM) 116 and random access memory (RAM) 118. Memory 104 may be configured to store program instructions and data during operation of device 100. In various embodiments, memory 104 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. Memory 104 may also include nonvolatile memory technologies such as nonvolatile flash RAM (NVRAM) or ROM. In some embodiments, it is contemplated that memory 104 may include a combination of technologies such as the foregoing, as well as other technologies not specifically mentioned. When the subject matter is implemented in a computer system, a basic input/output system (BIOS) 120, containing the basic routines that help to transfer information between elements within the computer system, such as during start-up, is stored in ROM 116.

The storage 106 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 100.

It is noted that the methods described herein can be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 106, ROM 116 or RAM 118, including an operating system 122, one or more applications programs 124, program data 126, and other program modules 128. A user may enter commands and information into the hardware device 100 through data entry module 108. Data entry module 108 may include mechanisms such as a keyboard, a touch screen, a pointing device, etc. Other external input devices (not shown) are connected to the hardware device 100 via external data entry interface 130. By way of example and not limitation, external input devices may include a microphone, joystick, game pad, satellite dish, scanner, or the like. In some embodiments, external input devices may include video or audio input devices such as a video camera, a still camera, etc. Data entry module 108 may be configured to receive input from one or more users of device 100 and to deliver such input to processing unit 102 and/or memory 104 via bus 114.

A display 132 is also connected to the bus 114 via display adapter 110. Display 132 may be configured to display output of device 100 to one or more users. In some embodiments, a given device such as a touch screen, for example, may function as both data entry module 108 and display 132. External display devices may also be connected to the bus 114 via external display interface 134. Other peripheral output devices, not shown, such as speakers and printers, may be connected to the hardware device 100.

The hardware device 100 may operate in a networked environment using logical connections to one or more remote nodes (not shown) via communication interface 112. The remote node may be another computer, a server, a router, a peer device or other common network node, and typically includes many or all of the elements described above relative to the hardware device 100. The communication interface 112 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, communication interface 112 may include logic configured to support direct memory access (DMA) transfers between memory 104 and other devices.

In a networked environment, program modules depicted relative to the hardware device 100, or portions thereof, may be stored in a remote storage device, such as, for example, on a server. It will be appreciated that other hardware and/or software to establish a communications link between the hardware device 100 and other devices may be used.

It should be understood that the arrangement of hardware device 100 illustrated in FIG. 1 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) can be realized, in whole or in part, by at least some of the components illustrated in the arrangement of hardware device 100. In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 1. Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the description that follows, the subject matter will be described with reference to acts and symbolic representations of operations that are performed by one or more devices, unless indicated otherwise. As such, it will be understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is being described in the foregoing context, it is not meant to be limiting as those of skill in the art will appreciate that various of the acts and operation described hereinafter may also be implemented in hardware.

To facilitate an understanding of the subject matter described below, many aspects are described in terms of sequences of actions. At least one of these aspects defined by the claims is performed by an electronic hardware component. For example, it will be recognized that the various actions can be performed by specialized circuits or circuitry, by program instructions being executed by one or more processors, or by a combination of both. The description herein of any sequence of actions is not intended to imply that the specific order described for performing that sequence must be followed. All methods described herein can be performed in any suitable order unless otherwise indicated herein or otherwise clearly contradicted by context. In an embodiment, the computer system 100 includes one or more methods for calculating costs of application operations in a virtually provisioned environment.

Figure 2:
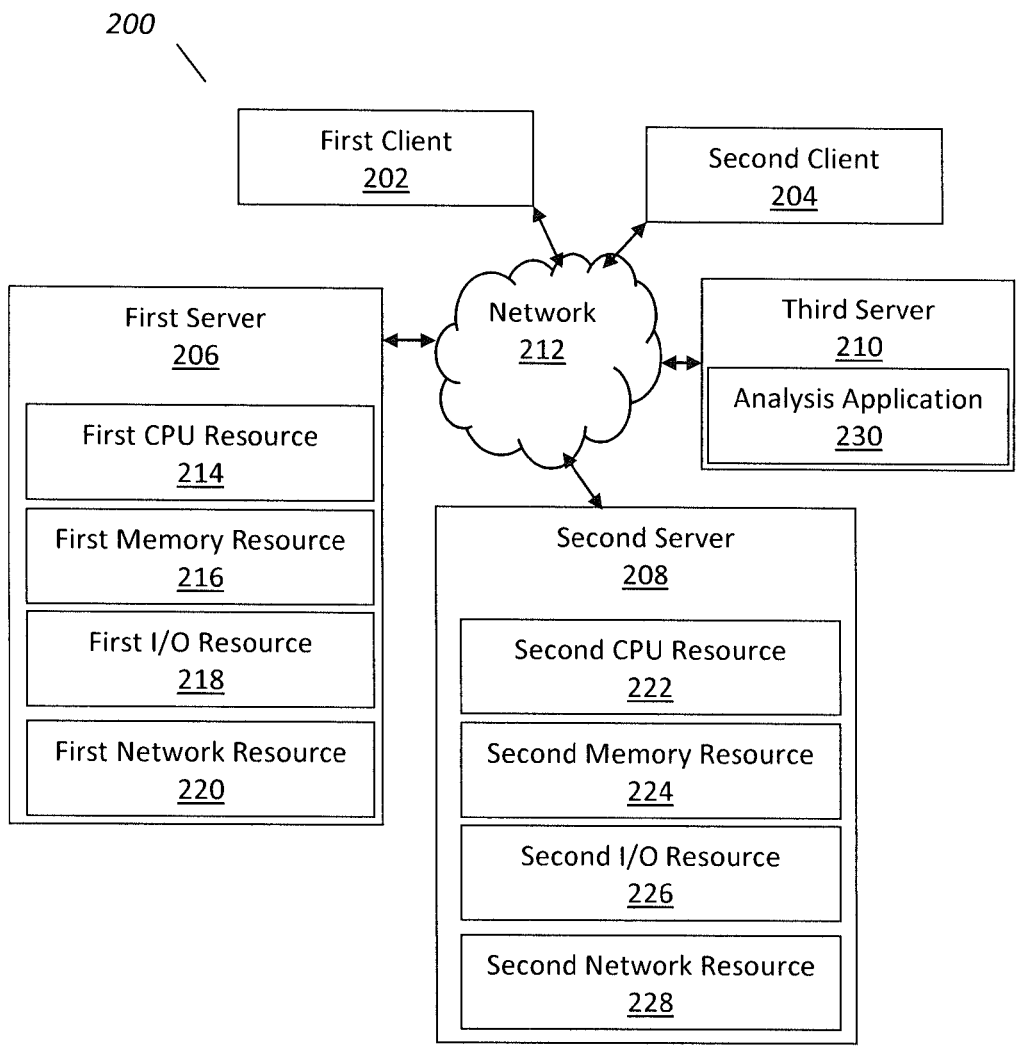
FIG. 2 illustrates a block diagram of an example system for calculating costs of application operations in a virtually provisioned environment, under an embodiment.

FIG. 2 illustrates a block diagram of a system that implements calculating costs of application operations in a virtually provisioned environment, under an embodiment. As shown in FIG. 2, system 200 may illustrate a cloud computing environment in which data, applications, services, and other resources are stored and delivered through shared data-centers and appear as a single point of access for the users. The system 200 may also represent any other type of distributed computer network environment in which servers control the storage and distribution of resources and services for different client users.

In an embodiment, the system 200 represents a cloud computing system that includes a first client 202 and a second client 204; and a first server 206, a second server 208, and a third server 210 that are provided by a hosting company. The clients 202-204 and the servers 206-210 communicate via a network 212. An enterprise uses the clients 202-204 to execute an enterprise application via the servers 206-208. The first server 206 allocates a first CPU resource 214, a first memory resource 216, a first I/O resource 218, and a first network resource 220 to process an enterprise application's operation in a virtually provisioned environment. The second server 208 allocates a second CPU resource 222, a second memory resource 224, a second I/O resource 226, and a second network resource 228 to process an enterprise application's operation in a virtually provisioned environment. FIG. 2 does not depict the location of an enterprise application because the operations of the enterprise application may be processed by any combination of the resources 214-220 allocated by the first server 206 and the resources 222-228 allocated by the second server 208. The third server 210 includes an analysis application 230 to calculate costs of application operations in a virtually provisioned environment. Although FIG. 2 depicts the system 200 with two clients 202-204, three servers 206-210, one network 212, two CPU resources 214 and 222, two memory resources 216 and 224, two I/O resources 218 and 226, two network resources 220 and 228, and one analysis application 230, the system 200 may include any number of clients 202-204, servers 206-210, networks 212, CPU resources 214 and 222, memory resources 216 and 224, I/O resources 218 and 226, network resources 220 and 228, and analysis applications 230. The clients 202-204 and the servers 206-210 may each be substantially similar to the system 100 depicted in FIG. 1.

The analysis application 230 performs analysis of the application operations that are defined in a case management application, which defines business data (such as customer, vendor, etc.), documents (receipt, p. o., etc.), user interface page composition for each one of the tasks that users need to perform, data services, and business processes. For example, the analysis application 230 determines that a welcome screen requires three data sources to be executed based on the definition of the welcome screen that specifies getting information from data service #1, data service #3, and data service #5. Case management uses a predefined blueprint in order to perform virtual provisioning of the runtime environment as well as to perform deployment of an application. The blueprint is a configuration file defining details of the target deployment environment topology. By combining the application definition analysis with the application blueprint, the analysis application 230 can determine the correlation between each application operation and the affected servers, such as data service #1 connects to server #1 to get data for the welcome screen, data service #3 connects to server #3 to get data for the welcome screen, and data service #5 connects to server #5 to get data for the welcome screen. The analysis application 230 identifies the servers that support application operations associated with executing an application, based on a configuration file. For example, the analysis application 230 identifies the servers 206-208 that support the application operation for opening a welcome screen based on a configuration file for the welcome screen application.

The analysis application 230 records a count of each type of application operation currently executing and a resource's utilization associated with each of the identified servers. In a very simple example, the analysis application 230 takes snapshots of a system's status, which includes 380 instances of application operation A, 320 instances of application operation B, 54% CPU utilization on the first server 206, 70% memory utilization on the first server 206, 80% I/O utilization on the first server 206, 40% CPU utilization on the second server 208, 40% memory utilization on the second server 208, and 67% I/O utilization on the second server 208.

The analysis application 230 applies mathematical analysis to determine the impact on the entire system of each operation type for any application operation that a user can perform in the context of simultaneously executed operations. Since the analysis application 230 identifies which servers participate in each type of application operation, the analysis application 230 creates a set of mathematical equations, such as:

$$R_i = \sum_{j=1}^{N} K_j O_j$$

where: R is a resource on particular server i, j is the number of operation types, K is the number of application operations of a particular type currently running in the system 200, and O is the operation type. All of the parameters in this equation are known except for the impact of each and individual application operations on the resources. The analysis application 230 uses this pattern for any type of resource to estimate the impact of each application operation on each server's resources.

The analysis application 230 takes a number of snapshots of resource utilizations that equal the number of application operations types to create a set of linear equation to solve. Solving simultaneous linear equations requires that the number of distinct linear equations in a set equals the number of independent variables to be solved. In a simplified example, the analysis application 230 take two snapshots because the first server 206 serves two application operations, application operation A and application operation B. Although this simplified example records statistics twice to match the number of two independent variables, the analysis application 230 can record statistics any number of times to match any number of independent variables. For the simplicity of this example, only the CPU utilization on the first server 206 is used. The first server 206 has a 54% CPU utilization while supporting 380 instances of application operation A and 320 instances of application operation B during the first snapshot. The first server 206 has a 52% CPU utilization while supporting 340 instances of application operation A and 360 instances of application operation B during the second snapshot.

The analysis application 230 creates a set of linear equations, wherein each linear equation equates a sum of a count of each type of application operation recorded as executing during an occasion with the resource utilization recorded on the occasion. In a very simple example, the analysis application 230 creates the set of two equations: 54% CPU=380A+320B and 52% CPU=340A+360B because the first server 206 had a 54% CPU utilization while supporting 380 instances of application operation A and 320 instances of application operation B during the first snapshot, and the first server 206 had a 52% CPU utilization while supporting 340 instances of application operation A and 360 instances of application operation B during the second snapshot.

The analysis application 230 solves the set of linear equations to estimate and output the resource costs of each individual type of application operation to assist in resource management. In a very simple example, the analysis application 230 solves the set of two linear equations to estimate and output the impact of application operation A on the first server 206 as 0.1% CPU utilization and the impact of application operation B on the first server 206 as 0.05% CPU utilization.

For the purpose of creating these simplified equations, the application operation workload is assumed to be evenly distributed between the two servers 206-208. For example, if the two servers 206-208 serve 390 instances of application operation A, the assumption is that at each point in time each of the two servers 206-208 will individually process 195 instances of application operation A. However, the analysis application 230 can take more complex distribution approaches. By applying this approach to each of the servers 206-208 and application operations A and B, the analysis application 230 can estimate data regarding each one of the application operations A and B, and how much resources each one of the application operations A and B consumes on each one of the servers 206-208. In a very simple example, the analysis application 230 can estimate that each single application operation A consumes the following resources on the servers 206-208 when executed in context of other simultaneous operations: 0.1% CPU utilization, 0.05% memory utilization, and 0.02% I/O utilization on the first server 206, and 0.02% CPU utilization, 0.02% memory utilization, and 0.05% I/O utilization on the second server 208.

The analysis application 230 calculates each application operation's impact on each server more and more precisely over time. The analysis application 230 averages the calculation results from the same time periods to achieve more precise calculations because the workload is similar during the same time periods, such as from 9 AM to 9:30 AM and from 9:30 AM to 10 AM. The analysis application 230 evaluates application operations and entire systems, rather than evaluating particular transactions, and calculates the impact of such application operations on the entire system, thereby providing a more comprehensive evaluation of an application's status. The analysis application 230 calculates the resource costs of each application operation in a virtually provisioned environment, which enables fine-tuning a system for a particular type of application operation performance, finding the dependency between application operation types and actual server performance, estimating how many users can be supported by the current servers and with the current service level agreements, and predicting servers entering into the red zone of a service level agreement, such as a CPU utilization of more than 90%.

Figure 3:
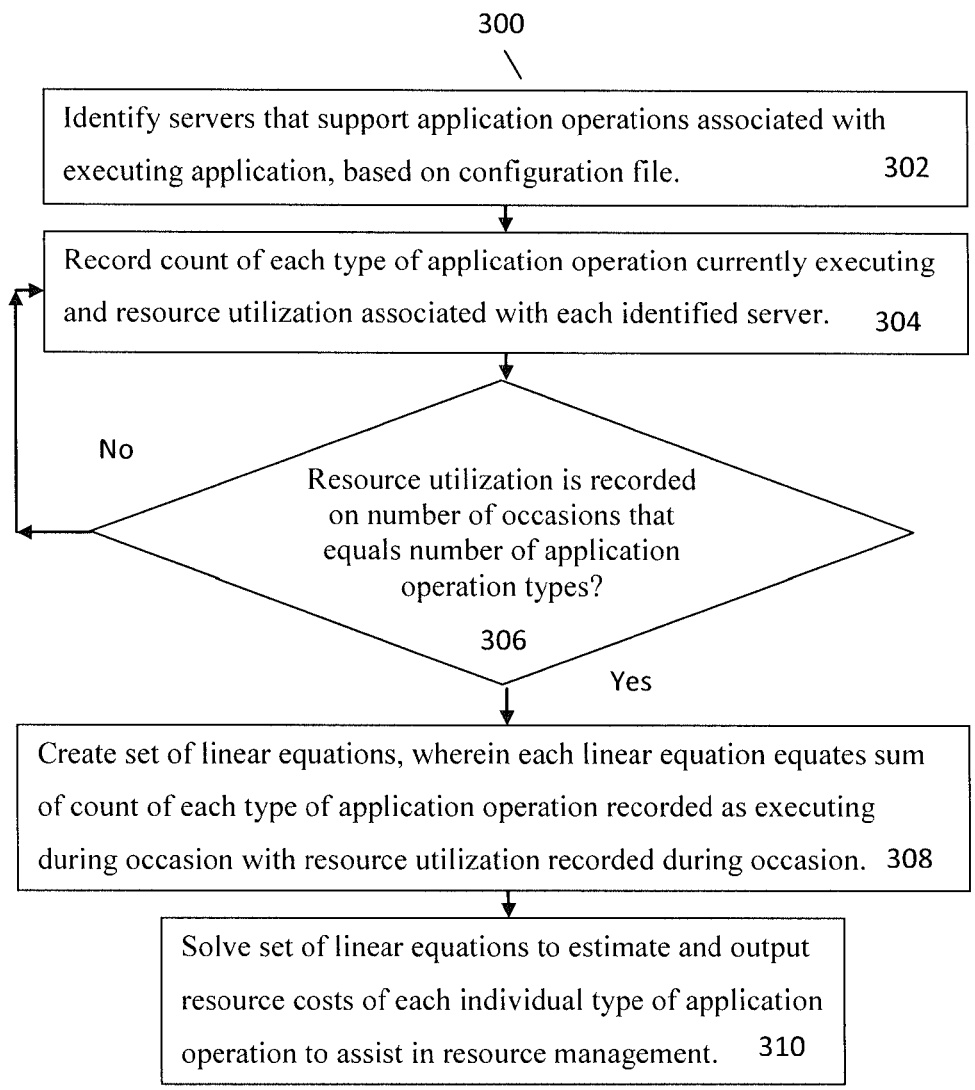
FIG. 3 is a flowchart that illustrates a method of calculating costs of application operations in a virtually provisioned environment, under an embodiment.

FIG. 3 is a flowchart that illustrates a method of calculating costs of application operations in a virtually provisioned environment. Flowchart 300 illustrates method acts illustrated as flowchart blocks for certain steps involved in and/or between the client 202-204 and/or the servers 206-210 of FIG. 2.

Servers are identified that support application operations associated with executing an application, based on a configuration file, act 302. For example, the analysis application 230 identifies the servers 206-208 that support the application operation for opening a welcome screen based on a configuration file for the welcome screen application.

A count of each type of application operation currently executing and a resource utilization associated with each server are recorded, act 304. In a very simple example, the analysis application 230 takes snapshots of system status, which includes: 380 instances of application operation A, 320 instances of application operation B, 54% CPU utilization on the first server 206, 70% memory utilization on the first server 206, 80% I/O utilization on the first server 206, 40% CPU utilization on the second server 208, 40% memory utilization on the second server 208, and 67% I/O utilization on the second server 208.

A determination is made whether a resource's utilization is recorded on a number of occasions that equals a number of application operation types, act 306. For example, the analysis application 230 determines that two snapshots were taken of the resources' utilization because the first server 206 serves two application operations, application operation A and application operation B. If the resource's utilization is recorded on a number of occasions that equals the number of application operation types, the flowchart 300 continues to act 308. If the resource's utilization is not recorded on a number of occasions that equals the number of application operation types, the flowchart 300 returns to act 304 to continue recording counts of each type of application operation currently executing and resources' utilizations associated with each server.

A set of linear equations is created, wherein each linear equation equates a sum of a count of each type of application operation recorded as executing during an occasion with a resource utilization recorded during the occasion, act 308. In a very simple example, the analysis application 230 creates the set of two equations: 54% CPU=380A+320B and 52%

CPU=340A+360B because the first server 206 had a 54% CPU utilization while supporting 380 instances of application operation A and 320 instances of application operation B during the first snapshot, and a 52% CPU utilization while supporting 340 instances of application operation A and 360 instances of application operation B during the second snapshot.

The set of linear equations is solved to estimate and output resource costs of each individual type of application operation to assist in resource management, act 310. In a very simple example, the analysis application 230 solves the set of two linear equations to estimate, and output, the impact of application operation A on the first server 206 as 0.1% CPU utilization and the impact of application operation B on the first server 206 as 0.05% CPU utilization. The analysis application 230 calculates the resource costs of each application operation in a virtually provisioned environment, which enables fine-tuning a system for a particular type of application operation performance, finding the dependency between application operation types and actual server performance, estimating how many users can be supported by the current servers and with the current service level agreements, and predicting servers entering into the red zone of a service level agreement, such as a CPU utilization of more than 90%.

Although FIG. 3 depicts the acts 302-310 occurring in a specific order, the acts 302-310 may occur in another order. Embodiments herein enable calculating costs of application operations in a virtually provisioned environment.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

Preferred embodiments are described herein, including the best mode known to the inventor for carrying out the claimed subject matter. Of course, variations of those preferred embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A system for calculating costs of application operations in a virtually provisioned environment, the system comprising:
   one or more processors; and
   a non-transitory computer readable medium storing a plurality of instructions, which when executed, will cause the one or more processors to:
      identify a plurality of servers that support application operations associated with executing an application, based on a configuration file;
      record a count of each type of application operation currently executing and a resource utilization associated with each of the identified plurality of servers;
      create a set of linear equations in response to a determination that the number of times the resource utilization was recorded on a plurality of occasions equals the number of different types of application operation executed on the plurality of occasions, wherein each linear equation equates a sum of a count of each type of application operation recorded as executing during an occasion with the resource utilization recorded during the occasion; and
      solve the set of linear equations to estimate and output resource costs of each individual type of application operation to assist in resource management.

2. The system of claim 1, wherein the resource utilization comprises a percentage of a maximum possible resource utilization.

3. The system of claim 1, wherein the resource utilization comprises a central processing unit utilization.

4. The system of claim 1, wherein the resource utilization comprises a memory utilization.

5. The system of claim 1, wherein the resource utilization comprises an input-output utilization.

6. The system of claim 1, wherein the resource utilization comprises a network utilization.

7. The system of claim 1, wherein the resource utilization comprises a central processing unit utilization, a memory utilization, an input-output utilization, and a network utilization.

8. A computer-implemented product, comprising a non-transitory computer readable medium having a computer readable program code embodied therein, the computer readable program code adapted to be executed by one or more processor to implement a method for calculating costs of application operations in a virtually provisioned environment, the method comprising:
   identifying a plurality of servers that support application operations associated with executing an application, based on a configuration file;
   recording a count of each type of application operation currently executing and a resource utilization associated with each of the identified plurality of servers;
   creating a set of linear equations in response to a determination that the number of times the resource utilization was recorded on a plurality of occasions equals the number of different types of application operation executed on the plurality of occasions, wherein each linear equation equates a sum of a count of each type of application operation recorded as executing during an occasion with the resource utilization recorded during the occasion; and solving the set of linear equations to estimate and output resource costs of each individual type of application operation to assist in resource management.

9. The computer-implemented method of claim 8, wherein the resource utilization comprises a percentage of a maximum possible resource utilization.

10. The computer-implemented method of claim 8, wherein the resource utilization comprises a central processing unit utilization.

11. The computer-implemented method of claim 8, wherein the resource utilization comprises a memory utilization.

12. The computer-implemented method of claim 8, wherein the resource utilization comprises an input-output utilization.

13. The computer-implemented method of claim 8, wherein the resource utilization comprises a network utilization.

14. The computer-implemented method of claim 8, wherein the resource utilization comprises a central processing unit utilization, a memory utilization, an input-output utilization, and a network utilization.

15. A computer program product, comprising a non-transitory computer-readable medium having a computer-readable program code embodied therein, the computer-readable program code adapted to be executed by one or more processors to implement a method for calculating costs of application operations in a virtually provisioned environment, the method comprising:

identifying a plurality of servers that support application operations associated with executing an application, based on a configuration file;

recording a count of each type of application operation currently executing and a resource utilization associated with each of the identified plurality of servers;

creating a set of linear equations in response to a determination that the number of times the resource utilization was recorded on a plurality of occasions equals the number of different types of application operation executed on the plurality of occasions, wherein each linear equation equates a sum of a count of each type of application operation recorded as executing during an occasion with the resource utilization recorded during the occasion; and solving the set of linear equations to estimate and output resource costs of each individual type of application operation to assist in resource management.

16. The computer program product of claim 15, wherein the resource utilization comprises a percentage of a maximum possible resource utilization.

17. The computer program product of claim 15, wherein the resource utilization comprises a central processing unit utilization.

18. The computer program product of claim 15, wherein the resource utilization comprises a memory utilization.

19. The computer program product of claim 15, wherein the resource utilization comprises an input-output utilization.

20. The computer program product of claim 15, wherein the resource utilization comprises a network utilization.

\* \* \* \* \*